(12) United States Patent
Zhang et al.

(10) Patent No.: US 10,397,386 B1
(45) Date of Patent: Aug. 27, 2019

(54) SYSTEM AND METHOD FOR PROVIDING TEST SCENARIO REPRODUCTION FOR A DEVICE UNDER TEST

(71) Applicant: MARVELL INTERNATIONAL LTD., Hamilton (BM)

(72) Inventors: Haoxiang Zhang, Shanghai (CN); Keren He, Shanghai (CN)

(73) Assignee: Marvell International Ltd. (BM)

( * ) Notice: Subject to any disclaimer, the term of this patent is extended or adjusted under 35 U.S.C. 154(b) by 247 days.

(21) Appl. No.: 15/235,585

(22) Filed: Aug. 12, 2016

Related U.S. Application Data

(60) Provisional application No. 62/206,462, filed on Aug. 18, 2015.

(51) Int. Cl.
| | |
|---|---|
| *H04M 1/24* | (2006.01) |
| *G06F 3/0488* | (2013.01) |
| *G06F 3/14* | (2006.01) |
| *G06F 3/16* | (2006.01) |

(52) U.S. Cl.
CPC .......... *H04M 1/24* (2013.01); *G06F 3/04883* (2013.01); *G06F 3/1454* (2013.01); *G06F 3/16* (2013.01)

(58) Field of Classification Search
None
See application file for complete search history.

(56) References Cited

U.S. PATENT DOCUMENTS

| | | | | |
|---|---|---|---|---|
| 9,469,037 | B2 * | 10/2016 | Matthews | G01M 99/008 |
| 9,652,077 | B2 * | 5/2017 | Jenkinson | G06F 3/0418 |
| 9,948,411 | B2 * | 4/2018 | Diperna | H04B 17/11 |
| 10,020,899 | B2 * | 7/2018 | Diperna | H04B 17/11 |
| 2012/0280934 | A1 * | 11/2012 | Ha | G06F 3/0416 345/174 |
| 2013/0345864 | A1 * | 12/2013 | Park | B25J 9/1612 700/248 |
| 2014/0111484 | A1 * | 4/2014 | Welch | G06F 3/041 345/178 |
| 2014/0139455 | A1 * | 5/2014 | Argiro | A63F 13/02 345/173 |
| 2014/0305224 | A1 * | 10/2014 | Zhang | G01M 99/007 73/818 |
| 2016/0065702 | A1 * | 3/2016 | Carnevali | G06F 1/1628 455/575.8 |
| 2016/0187876 | A1 * | 6/2016 | Diperna | H04B 17/11 702/81 |
| 2016/0320889 | A1 * | 11/2016 | Jenkinson | G06F 11/2221 |
| 2017/0052527 | A1 * | 2/2017 | Dougherty | G05B 19/402 |

* cited by examiner

*Primary Examiner* — David M. Gray
*Assistant Examiner* — Geoffrey T Evans

(57) ABSTRACT

Apparatus, methods, and other embodiments associated with debugging a device-under-test are disclosed. In one embodiment, a method includes sensing and recording a screen image produced by a device-under-test as the device-under-test is being operated. The sensing and recording of the screen image are performed by an apparatus. The method also includes sensing and recording coordinates and durations of gestures impinged upon the apparatus while operating the device-under-test. The sensing and recording of the coordinates and durations are performed by the apparatus. The apparatus is configured to physically conform to the device-under-test to allow functionality of the device-under-test through the apparatus.

10 Claims, 9 Drawing Sheets

SYSTEM AND METHOD FOR PROVIDING TEST SCENARIO REPRODUCTION FOR A DEVICE UNDER TEST

CROSS REFERENCE TO RELATED APPLICATIONS

This patent disclosure claims the benefit of U.S. Provisional Application Ser. No. 62/206,462 filed on Aug. 18, 2015, which is hereby wholly incorporated by reference.

BACKGROUND

When a problem occurs while testing a device (e.g., a mobile telephone device), it may be desirable to reproduce that problem during debugging of the device. For example, a software developer may desire to reproduce the problem to help identify a part of the software code that is not operating correctly when executed by the device (e.g., due to a coding error bug). A user (e.g., a tester) may try to communicate to the developer their device interactions that occurred when the problem manifested. However, the user may not exactly remember their actions and interactions. As a result, the developer may not be able to reproduce the problem.

It may be helpful to video record the user testing the device. The developer can go back and review the video recording to see what actions were taken by the user until the problem occurred. However, as the user moves around while testing the device, parts of the device may be blocked from view and not all actions may be apparent on the video recording. In some instances, the device itself may be configured to monitor and record interactions with the device. However, if the device experiences a severe problem (e.g., a system restart, a hang-up, a breakdown, etc.), it may be impossible to recover the monitored and recorded interactions.

SUMMARY

In general, in one aspect, this specification discloses a test scenario reproduction apparatus which includes installable components configured to be installed on a device-under-test. The installable components are configured to physically conform to the device-under-test when installed to allow functionality of the device-under-test to be exercised by a user through the components. The installable components include a permeability layer configured to allow a screen image produced by the device-under-test to penetrate the apparatus. The permeability layer is also configured to transfer gestures, impinged upon the permeability layer by the user, to the device-under-test. The installable components also include a camera sensor configured to sense the screen image, and an image recorder configured to record the screen image as sensed by the camera sensor. The installable components further include a pressure sensor configured to sense coordinates and durations of the user gestures, and a gesture recorder configured to record the coordinates and durations of the user gestures as sensed by the pressure sensor.

In general, in another aspect, this specification discloses a method that is performable by a test scenario reproduction apparatus. The test scenario reproduction apparatus is configured to be installed on a device-under-test and to physically conform to the device-under-test when installed to allow functionality of the device-under-test to be exercised by a user through the test scenario reproduction apparatus. The method includes sensing and recording a screen image produced by the device-under-test as the device-under-test is being operated by the user. The sensing and recording of the screen image are performed by the test scenario reproduction apparatus installed on the device-under-test. The method also includes sensing and recording coordinates and durations of gestures impinged upon the test scenario reproduction apparatus by the user while operating the device-under-test. The sensing and recording of the coordinates and the durations are performed by the test scenario reproduction apparatus installed on the device-under-test.

In general, in another aspect, this specification discloses a non-transitory computer readable medium. In one embodiment, the non-transitory computer readable medium stores instructions that, when executed by one or more processors of a computing device, cause the computing device to read digital data from a removable storage device of a test scenario reproduction apparatus. The digital data represents aspects of a test scenario performed on a device-under-test. The digital data was recorded and saved to the removable storage device, during the test scenario, by the test scenario reproduction apparatus installed on the device-under-test. The non-transitory computer readable medium also stores instructions that, when executed by the one or more processors of the computing device, cause the computing device to generate an interactive graphical user interface based on the digital data. The interactive graphical user interface is configured to allow a user to view and analyze representations of the aspects of the test scenario on a display screen of the computing device.

BRIEF DESCRIPTION OF THE DRAWINGS

The accompanying drawings, which are incorporated in and constitute a part of the specification, illustrate various systems, methods, and other embodiments of the disclosure. Illustrated element boundaries (e.g., boxes, groups of boxes, or other shapes) in the figures represent one example of the boundaries. In some examples one element may be designed as multiple elements or multiple elements may be designed as one element. In some examples, an element shown as an internal component of another element may be implemented as an external component and vice versa.

DETAILED DESCRIPTION

Figure 1:
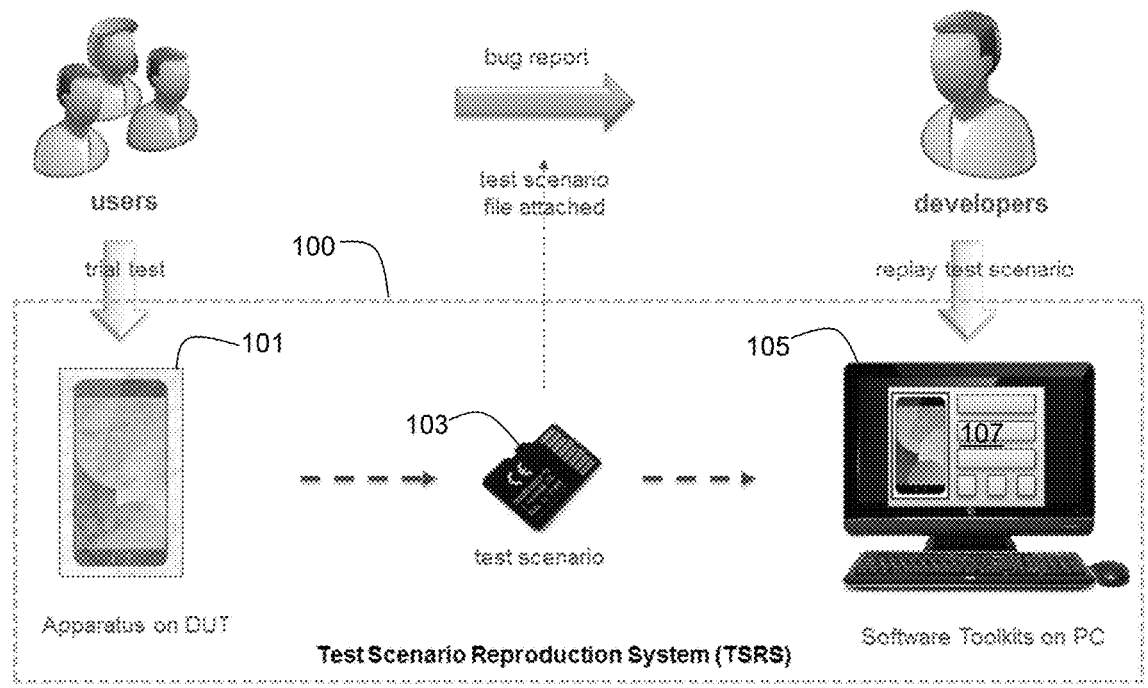
FIG. 1 illustrates one embodiment of a test scenario reproduction system for debugging problems associated with a device-under-test.

Described herein are examples of systems, apparatus, methods, and other embodiments associated with testing a device-under-test. In particular, embodiments are described herein for capturing a test scenario performed on a device-under-test and allowing the test scenario to be played back and analyzed. The test scenario is captured by an apparatus that is installed on the device-under-test. The apparatus is configured to physically conform to the device-under-test when installed such that the functionality of the device-under-test can still be exercised by a user through the apparatus. The device-under-test may be, for example, a mobile telephone device (e.g., a "smart phone") having a display screen configured as a touch screen user interface.

In one embodiment, the apparatus installed on the device-under-test includes a permeable layer. The permeable layer allows a screen image produced by the device-under-test to penetrate through the apparatus (i.e., the permeable layer is transparent to light). The permeable layer is also flexible and allows gestures, impinged on the permeable layer by a user (e.g., by a user's finger), to be transferred to the device-under-test (e.g., transferred to a touch screen of a mobile telephone device providing a user interface). The apparatus is configured to capture screen images displayed by the device-under-test as well as coordinates and durations of impinged user gestures during a test scenario. Certain embodiments of the apparatus may also be configured to capture other aspects of the test scenario, as described later herein.

The term "device-under-test", as used herein, refers to a device (e.g., a mobile telephone device) that is having its functionality exercised by a user (e.g., a tester).

The term "test scenario", as used herein, refers to a series of interactions performed by a user (e.g., a tester) on a device-under-test which may result in a problem occurring with the device-under-test due to, for example, a software bug.

The term "installable component", as used herein, refers to a portion of an apparatus that is configured to be installed on a device-under-test, where the installable component physically conforms to the device-under-test when installed to allow functionality of the device-under-test to be exercised by a user (e.g., a tester) through the device-under-test.

The term "test scenario toolkit", as used herein, refers to a software application including a set of software instructions stored on a non-transitory computer readable medium and/or installed on a computing device. The test scenario toolkit is configured to allow a user (e.g., a software developer) to view and analyze data captured during a test scenario to help debug a device-under-test.

An "integrated circuit" is an electronic circuit formed on a small piece of semiconducting material (a chip) to perform functions, instead of performing the same functions as a larger circuit made from discrete components, for example. A "chip" is the small piece of semiconducting material (often silicon) on which an integrated circuit is embedded. The terms "chip" and "integrated circuit" may be used interchangeably herein, however. The term "integrated circuit chip" may be used herein to mean a chip having an integrated circuit formed thereon. The term "integrated circuit device", as used herein, refers to a device having multiple integrated circuits on multiple chips.

FIG. 1 illustrates one embodiment of a test scenario reproduction system 100 for debugging problems associated with a device-under-test (DUT). The test scenario reproduction system 100 includes a test scenario reproduction apparatus (TSRA) 101 having a removable storage device 103. The test scenario reproduction system 100 also includes a computing device 105 having a test scenario toolkit 107 (e.g., a software application) installed thereon.

The TSRA 101 is configured to be installed on a device-under-test (DUT). The DUT may be, for example, a mobile telephone device (e.g., a "smart phone"). The TSRA 101 is configured to be installed on the DUT such that the TSRA 101 physically conforms to the DUT, when installed, allowing the functionality of the DUT to be exercised by a user through the TSRA 101. When operating, the TSRA 101 is configured to capture digital data representing various aspects of the DUT when being tested by a user (e.g., a tester) during a test scenario. For example, in one embodiment, the TSRA 101 is configured to capture digital data representing a screen image produced by the DUT, sounds produced by the DUT, and coordinates and durations of gestures impinged on the TSRA 101 by the user during the test scenario.

The digital data captured during the test scenario is stored on the removable storage device 103 in a file library, in accordance with one embodiment. The removable storage device 103 is configured to be removed from the TSRA 101 and inserted into a port of the computing device 105. The computing device 105 is configured to read the digital data from the removable storage device 103, under control of the test scenario toolkit 107 executing on the computing device 105. The test scenario toolkit 107 allows various aspects of the test scenario, as captured in the digital data, to be displayed on a display screen of the computing device 105 via an interactive graphical user interface. A user (e.g., a software developer) of the computing device 105 can view and analyze the test scenario, using the test scenario toolkit 107 on the computing device 105 via the interactive graphical user interface, to debug the DUT based on a problem that occurred.

Figure 2:
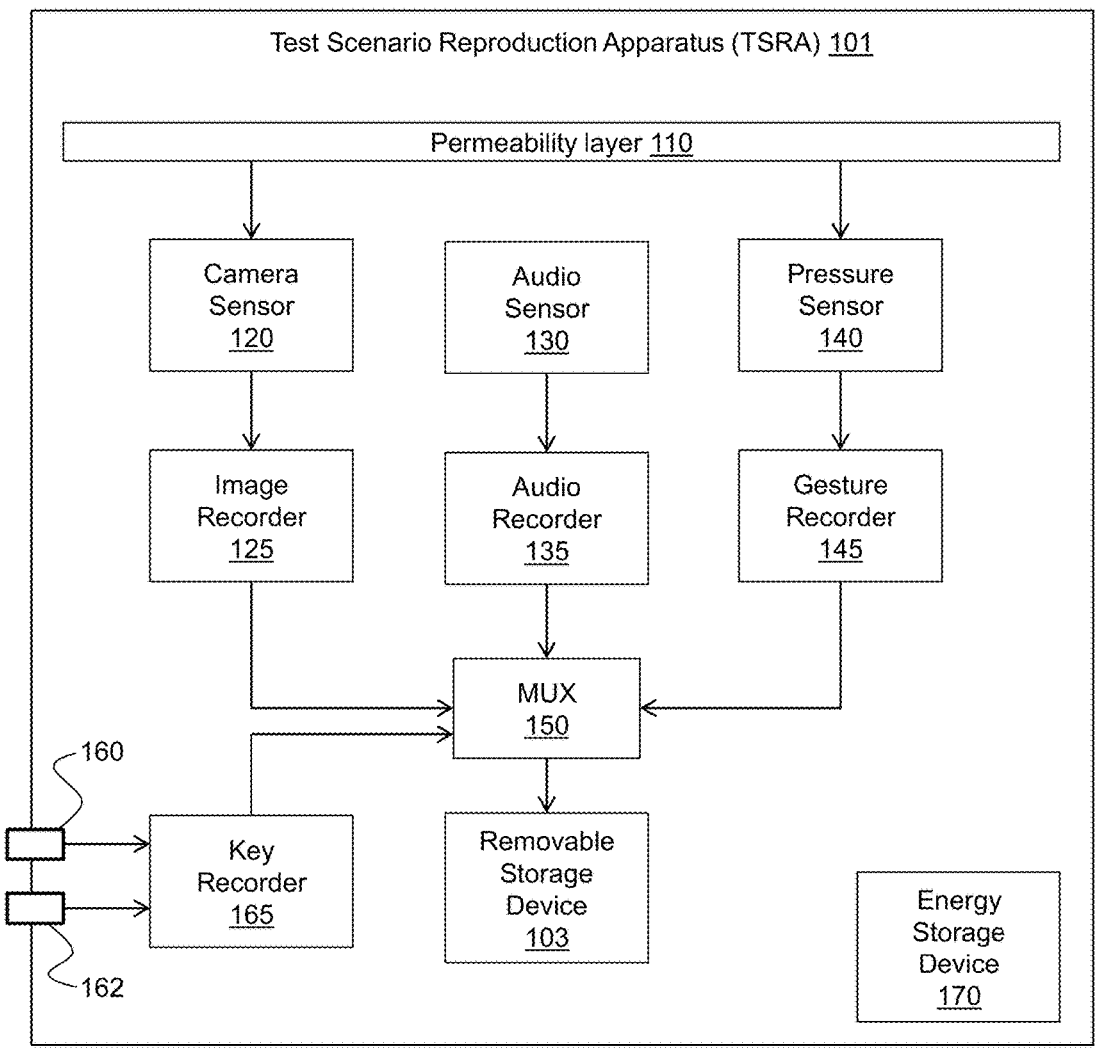
FIG. 2 illustrates one embodiment of a test scenario reproduction apparatus of the test scenario reproduction system of FIG. 1.

FIG. 2 illustrates one embodiment of a test scenario reproduction apparatus (TSRA) 101 of the test scenario reproduction system 100 of FIG. 1. The TSRA 101 includes multiple elements for performing the various functions of the TSRA 101. The multiple elements of the TSRA 101 include but are not limited to a removable storage device 103, a permeability layer 110, a camera sensor 120, an image recorder 125, an audio sensor 130, an audio recorder 135, a pressure sensor 140, a gesture recorder 145, a data multiplexer (MUX) 150, a power key 160, a button key 162, a key recorder 165, and an energy storage device 170, or any combination thereof. The recorders 125, 135, 145, and 165 may be part of the same processing unit or different units, in accordance with various embodiments.

In one embodiment, certain elements of the TSRA 101 are implemented on a chip (i.e., a system-on-chip or SOC configuration) including one or more integrated circuits configured to perform one or more of the functions described herein. In another embodiment, certain elements of the TSRA 101 include executable algorithms configured to perform certain functions of the TSRA 101, where the algorithms are stored in a non-transitory medium.

Other embodiments may provide different elements (e.g., logics/modules) or combinations of elements that provide the same or similar functionality as the TSRA 101 of FIG. 2. In one embodiment, the TSRA 101 includes an executable application including algorithms and/or program modules configured to perform certain functions of the elements. The application is stored in a non-transitory computer storage medium. That is, in one embodiment, certain elements of the TSRA 101 are implemented as modules of computer-executable instructions stored on a computer-readable medium.

The TSRA 101 of FIG. 2 is configured to be installed on a device-under-test (DUT). In one embodiment, when installed, the TSRA 101 forms a protective housing around the DUT. In accordance with one embodiment, the multiple elements of the TSRA 101 are distributed across multiple installable components. The installable components are configured to be installed on a device-under-test (DUT) in such a way that the functionality of the DUT can be exercised by a user through the installable components. The installable components are discussed in more detail herein with respect to at least FIGS. 5A, 5B, 6, and 7.

Referring again to FIG. 2, in one embodiment, the permeability layer 110 of the TSRA 101 is configured to allow a screen image produced by the DUT (e.g., a "smart phone" having a touch-sensitive display screen) to penetrate or transmit through the TSRA 101. In one embodiment, the permeability layer 110 is made of a transparent material (e.g., a clear plastic material) that in transparent to visible light and is positioned over the display screen of the DUT.

The camera sensor 120 is positioned proximate the permeability layer 110 such that the camera sensor can detect (sense) the screen image penetrating through the permeability layer 110, in accordance with one embodiment. The image recorder 125 is configured to receive sensed image data from the camera sensor 120 and record the sensed image data (i.e., the screen image) as digital data. For example, a screen image produced by a software application executing on the DUT during a test scenario may be sensed and recorded. In accordance with one embodiment, the camera sensor 120 is a digital optical sensor having charge-coupled-device (CCD) technology. The image recorder 125 is configured to record digital image data in memory.

In one embodiment, the permeability layer 110 of the TSRA 101 is also configured to allow gestures, impinged upon the permeability layer 110 by a user (e.g., by a user's finger), to transfer to the DUT. In one embodiment, the permeability layer 110 is made of a flexible material (e.g., a flexible plastic material) that is positioned over the display screen of the DUT when the TSRA is installed on the DUT. For example, the user can interact with a touch screen display of the DUT through the permeability layer 110 to make selections, etc. Other features of the DUT may be accessed through the permeability layer 110 as well, in accordance with various embodiments. In this way, even though the TSRA 101 is installed on the DUT, the full functionality of the DUT can be accessed through the TSRA 101.

The pressure sensor 140 is positioned proximate the permeability layer 110 such that the pressure sensor 140 can detect (sense) the gestures impinging upon the permeability layer 110. The gesture recorder 145 is configured to receive data from the pressure sensor 140 corresponding to the coordinates and durations of the gestures, and record the coordinates and durations as digital data in memory, in one embodiment. For example, a particular gesture may be sensed and recorded as a particular (x, y) coordinate that was touched for a certain duration (e.g., 0.5 seconds) during a test scenario. The (x, y) coordinate may correspond to a location of a particular functional icon displayed on the display screen of the DUT, for example. In accordance with one embodiment, the pressure sensor 140 is based on microelectromechanical system (MEMS) technology.

In one embodiment, the audio sensor 130 (e.g., a microphone) is configured to detect (sense) sounds produced by the DUT, as well as the surrounding environment, during a test scenario. For example, the audio sensor 130 may sense a sound produced by the DUT indicating that an invalid selection was made by the user. The audio sensor 130 may also sense words uttered by the user during a test scenario. The audio recorder 135 is configured to receive and record the sounds that are sensed by the audio sensor 130 as digital data in memory, in accordance with one embodiment. The audio sensor 130 may be an electret microphone, a condenser microphone, or a dynamic microphone, for example.

In one embodiment, the power key 160 is configured to be manipulated (e.g., pressed) by a user to start and stop recording of the screen image produced by the DUT, sounds produced by the DUT and the surrounding environment, and coordinates and durations of user gestures. For example, a user may press the power key 160 at the beginning of a test scenario to begin recording. The user may again press the power key 160 at the end of the test scenario to stop recording. In one embodiment, key recorder 165 is configured to record digital data in memory indicating that the power key 160 has been manipulated. For example, an ON indication or timestamp indicating when recording was started may be recorded by key recorder 165. Similarly, an OFF indication or timestamp indicating when recording was stopped may be recorded by key recorder 165. In accordance with one embodiment, the power key is based on piezoelectric technology.

In one embodiment, the button key 162 is configured to be manipulated (e.g. pressed) by a user to record a timestamp corresponding to a current time. For example, during a test scenario, a user may press the button key 162 when an event of significance occurs. As such, a timestamp corresponding to the time the significant event occurred is recorded. An event of significance may be, for example, when the display screen of the DUT starts flashing unexpectedly, indicating a problem with the DUT. Another event of significance may be, for example, when the DUT suddenly stops producing an expected audio, indicating a problem with the DUT. In one embodiment, key recorder 165 is configured to record the timestamp as digital data in memory when the button key 162 is manipulated. In accordance with one embodiment, the button key is based on piezoelectric technology.

In one embodiment, the data multiplexer device (MUX) 150 is configured to receive image data from the image recorder 125, audio data from the audio recorder 135, gesture data from the gesture recorder, and on/off data and timestamp data from the key recorder 165. The MUX 150 is also configured to combine the various types of data received into a file library format and store the data digitally as a file library on the removable storage device 103. In accordance with one embodiment, the MUX 150 is an integrated circuit device.

The removable storage device 103 is configured to be removed from the TSRA 101 (e.g., from an installable bottom component of the TSRA 101) and inserted into a port of the external computing device 105 of FIG. 1. The digital data in the file library may be read and processed by the computing device 105 while running the test scenario toolkit 107 (e.g., a software tool package) installed on the computing device 105 of FIG. 1 as discussed in more detail later herein. The removable storage device 103 is in the form of a digital storage memory card, in accordance with one embodiment. Other embodiments of the removable storage device 103 are possible as well.

In one embodiment, electrical power is provided to one or more of the camera sensor 120, the image recorder 125, the audio sensor 130, the audio recorder 135, the pressure sensor 140, the gesture recorder 145, the MUX 150, the key recorder 165, and the removable storage device 103 by the energy storage device 170. The energy storage device 170 is a battery (e.g., a lithium-ion battery), in accordance with one embodiment. The energy storage device 170 is a rechargeable power pack, in accordance with another embodiment. Other embodiments of the energy storage device 170 are possible as well.

In this manner, the test scenario reproduction apparatus (TSRA) 101 of FIG. 2 provides a reliable way to capture data while testing a device-under-test (DUT) during a test scenario. The captured data may allow a discovered problem with the DUT to be reproduced for debugging purposes.

Figure 3:
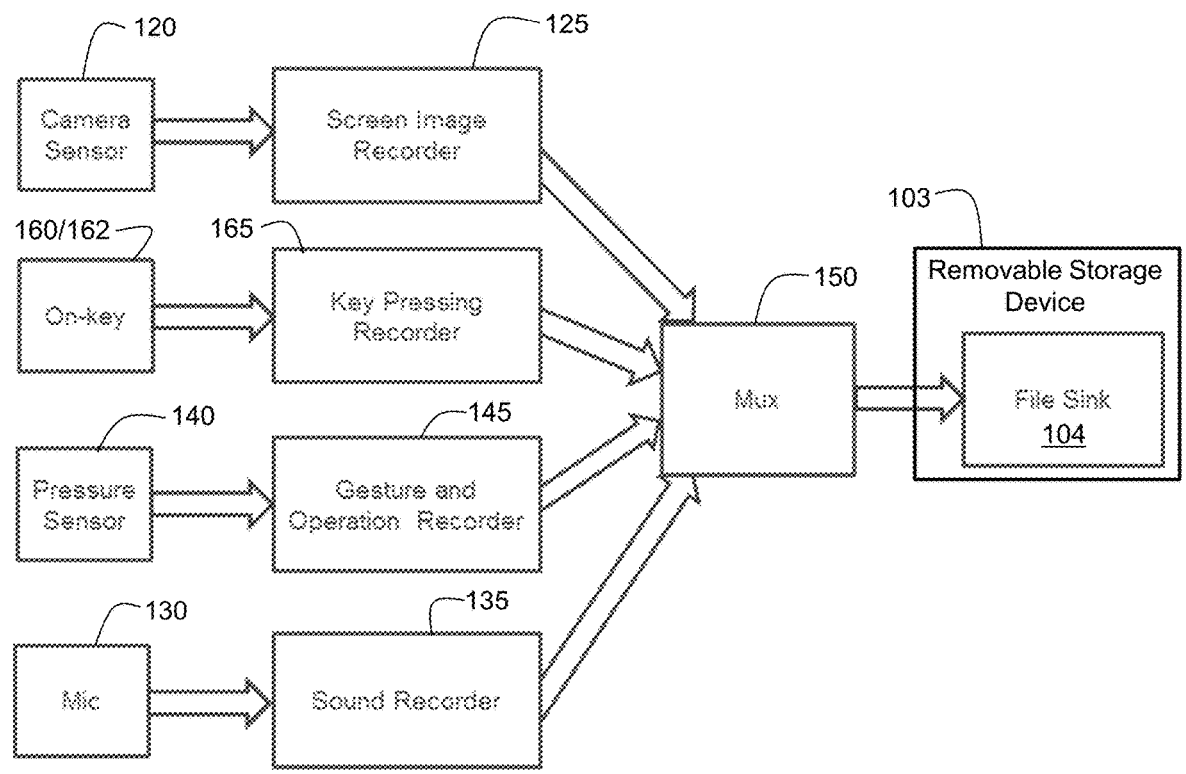
FIG. 3 illustrates one embodiment showing how data flows through the test scenario reproduction apparatus of FIG. 2.

FIG. 3 illustrates one embodiment showing how data flows through the test scenario reproduction apparatus (TSRA) 101 of FIG. 2. Image data flows from the camera sensor 120 to the image recorder 125 and is recorded in memory. Key data flows from the keys 160 and 162 to the key recorder 165 and is recorded in memory. Gesture data flows from the pressure sensor 140 to the gesture recorder 145 and is recorded in memory. Audio data flows from the microphone 130 to the audio (sound) recorder 135 and is recorded in memory. The recorded image data, key data, gesture data, and audio data are sent to the MUX 150 where the data, representing the test scenario in digital form, is combined into a file library format. The digital data, in the file library format, is then sent to the removable storage device 103 and is stored as a file library (file sink) 104. The digital data stored on the removable storage disk 103 is in a format that is compatible with the test scenario toolkit 107 such that the digital data can be read and processed by the test scenario toolkit 107 on the computing device 105.

Figure 4:
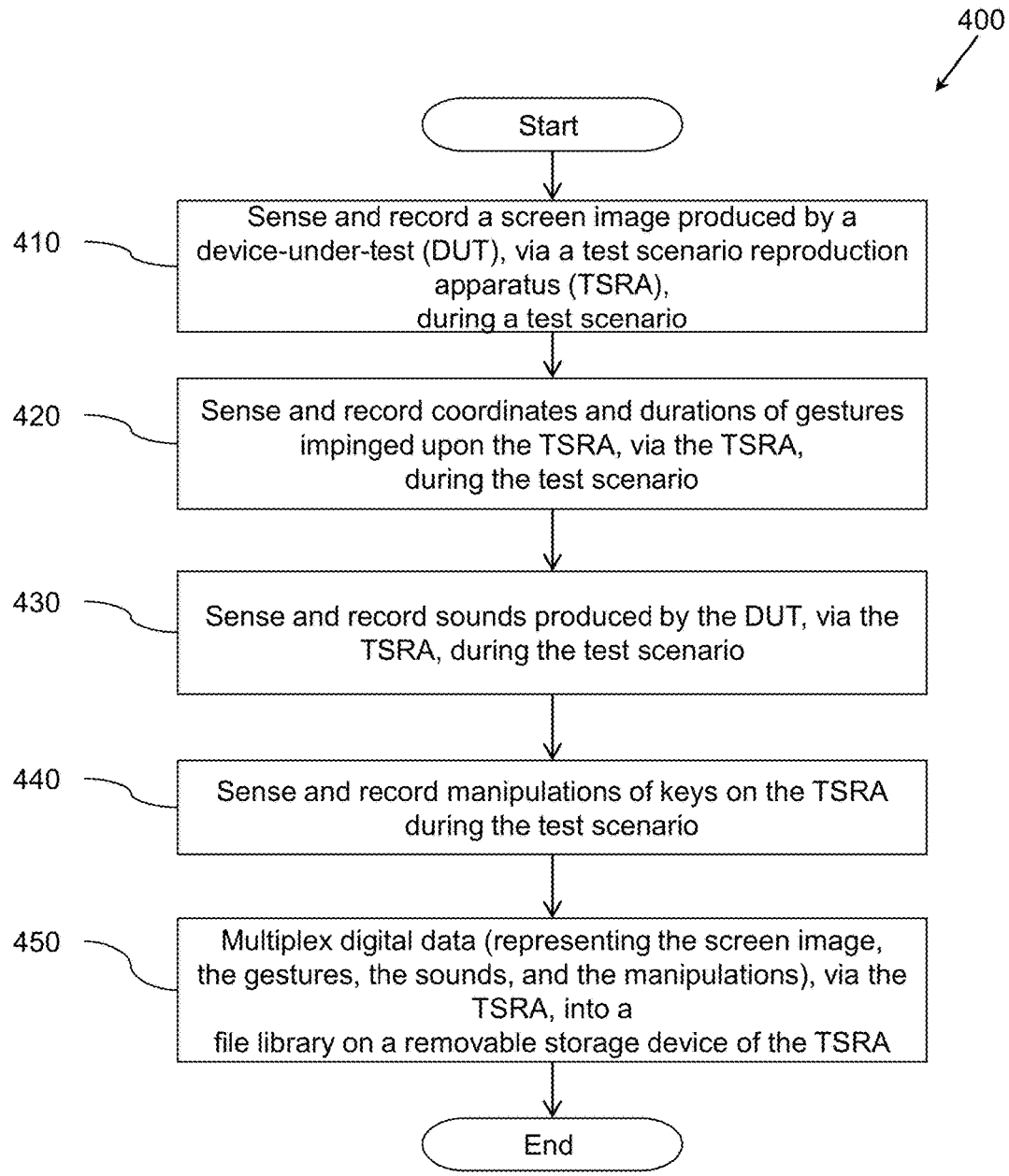
FIG. 4. illustrates one embodiment of a method performable by the test scenario reproduction apparatus of FIG. 2.

FIG. 4. illustrates one embodiment of a method 400 performable by the test scenario reproduction apparatus (TSRA) 101 of FIG. 2. FIG. 4 captures, in flowchart form, the functions and processes performed by the TSRA 101 previously discussed herein with respect to FIG. 2. Method 400 will be described from the perspective that a device-under-test (DUT) is to be tested during a test scenario. That is, the functionality of the DUT is to be exercised by a user (tester), and data representing the test scenario is to be captured by the TSRA 101 which is installed on the DUT during the test scenario.

Upon initiating method 400, at 410, a screen image produced by a device-under-test (DUT) is sensed (detected) and recorded as the DUT is being operated by a user during a test scenario. The sensing and recording of the screen image are performed by a test scenario reproduction apparatus (TSRA) installed on the DUT. In particular, in accordance with one embodiment, the sensing and recording of the screen image are performed by the camera sensor 120 and the image recorder 125 of the TSRA 101 of FIG. 2, respectively.

At 420, coordinates and durations of gestures impinged upon the TSRA 101 by the user while operating the DUT are sensed (detected) and recorded during the test scenario. The sensing and recording of the coordinates and the durations are performed by the TSRA installed on the DUT. In particular, in accordance with one embodiment, the sensing and recording of the coordinates and the durations of the gestures are performed by the pressure sensor 140 and the gesture recorder 145 of FIG. 2, respectively.

At 430, sounds produced by the device-under-test (DUT) are sensed (detected) and recorded as the DUT is being operated by the user during the test scenario. The sensing and recording of the sounds are performed by the test scenario reproduction apparatus (TSRA) installed on the DUT. In particular, in accordance with one embodiment, the sensing and recording of the sounds are performed by the audio sensor 130 and the audio recorder 135 of the TSRA 101 of FIG. 2, respectively.

At 440, data produced by manipulating keys on the TSRA installed on the DUT is recorded as the DUT is being operated by the user during the test scenario. The recording of the data is performed by the test scenario reproduction apparatus (TSRA) installed on the DUT. In particular, in accordance with one embodiment, manipulation of the button key 162 results in a timestamp being recorded by the key recorder 165 of the TSRA 101 of FIG. 2. The recorded timestamp corresponds to the current time when the button key 162 was pressed (manipulated).

Furthermore, in accordance with one embodiment, manipulation of the power key 160 results in the recording of data, by the key recorder 165, indicating that the power key 160 has been manipulated. As discussed previously herein, the purpose of the power key 160 is to start and stop recording of the screen image produced by the DUT, sounds produced by the DUT and the surrounding environment, and coordinates and durations of user gestures by image recorder 125, audio recorder 135, and gesture recorder 145, respectively.

At 450, the recorded data representing the screen image, the gestures, the sounds, and the key manipulations are multiplexed together, via the TSRA installed on the DUT, into a file library and stored on a removable storage device of the TSRA as digital data. In particular, in accordance with one embodiment, the multiplexing of the recorded data into the file library is performed by the MUX 150 of the TSRA 101 of FIG. 2, and the file library is stored on the removable storage device 103 of the TSRA 101 of FIG. 2. A user may remove the storage disk 103 from the TSRA 101 and insert the storage disk 103 into a port of an external computing device to read and process the digital data in the file library via a software tool package on the external computing device.

In this manner, data representing various aspects of a test scenario can be captured by an apparatus installed on a device-under-test. The apparatus installed on the device-under-test is configured to allow a user to operate the device-under-test through the apparatus, as installed, during the test scenario.

Figure 5A:
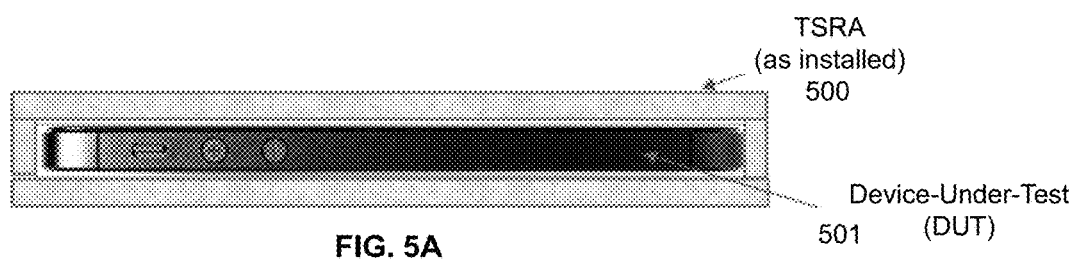
FIG. 5A illustrates an example embodiment of installable components of a test scenario reproduction apparatus installed on a device-under-test.
Figure 5B:
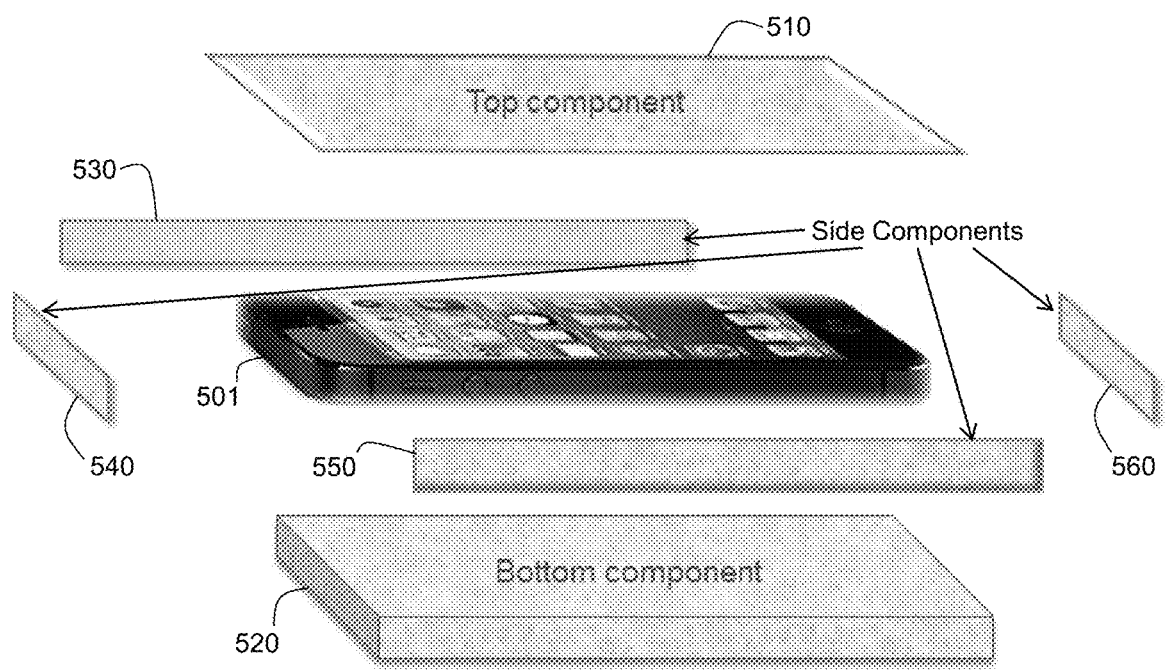
FIG. 5B illustrates an exploded view of the test scenario reproduction apparatus of FIG. 5A showing the installable components of the test scenario reproduction apparatus positioned around a device-under-test before installation.

FIG. 5A illustrates an example embodiment of installable components of a test scenario reproduction apparatus (TSRA) 500 installed on a device-under-test (DUT) 501. As seen in FIG. 5, the DUT 501 is a mobile "smart" phone which is enclosed by the installable components of the TSRA 500 when installed on the DUT 501. FIG. 5B illustrates an exploded view of the TSRA 500 of FIG. 5A showing the installable components of the TSRA 500 positioned around the DUT 501 before installation.

As seen in FIG. 5B, the TSRA 500 includes a top component 510, a bottom component 520, and side components 530, 540, 550, and 560. In accordance with one embodiment, the various elements of the TSRA (as shown in FIG. 2) are embedded within the installable components (510, 520, 530, 540, 550, and 560) and are part of the installable components. With reference to FIG. 2, in one embodiment, the top component 510 includes the permeability layer 110, the camera sensor 120, and the pressure sensor 140. The side component 540 includes the audio sensor 130, the audio recorder 135, and the button key 162. The side component 560 includes the power key 160. The side component 530 includes the image recorder 125. The side component 550 includes the gesture recorder 145. The bottom component 520 includes the MUX 150, the removable storage device 103, the key recorder 165, and the energy storage device 170.

In accordance with one embodiment, appropriate electrical interfaces are formed between the various installable components, when installed on the DUT 501. Such electrical interfaces ensure that the various elements of the TSRA shown in FIG. 2 can communicate with each other, and that electrical power can be supplied to the various elements. For example, in one embodiment, the various installable components of the TSRA 500 are configured to snap together to form both mechanical and electrical connections. The mechanical connections ensure that the installable components form a protective housing around the DUT 501 and physically conform to the DUT 501 to allow functionality of the DUT 501 to be exercised by a user through the installable components.

Figure 6:
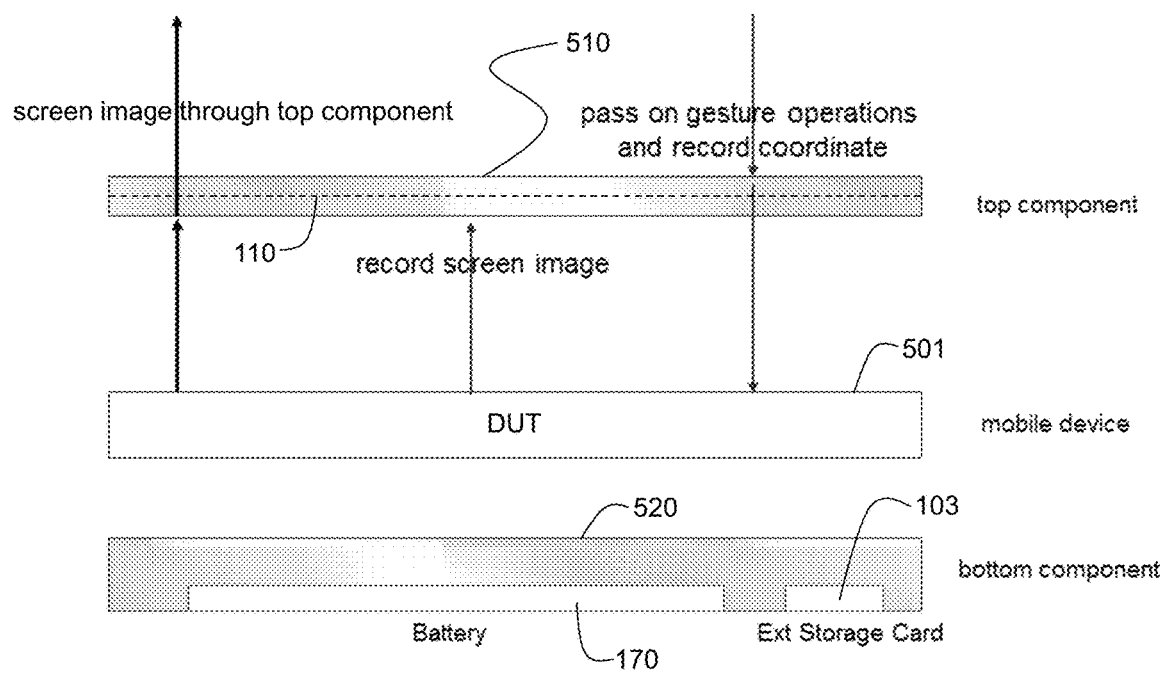
FIG. 6 illustrates a side view of a top component and a bottom component 520 of the test scenario reproduction apparatus of FIG. 5A and FIG. 5B with respect to a mobile device (i.e., a device-under-test).

FIG. 6 illustrates a side view of the top component 510 and the bottom component 520 of the test scenario reproduction apparatus (TSRA) 500 of FIG. 5A and FIG. 5B with respect to the mobile device 501 (i.e., the device-under-test). FIG. 6 shows the concept of a screen image produced by the DUT 501 projecting through the permeable layer 110 of the top component 510 to be recorded. FIG. 6 also shows the concept of gestures being transferred through the permeable layer 110 of the top component 510 to the DUT 501. The side view of the bottom component 520 in FIG. 6 shows the energy storage device 170 as a battery, and the removable storage device 103 as an external storage card.

Figure 7:
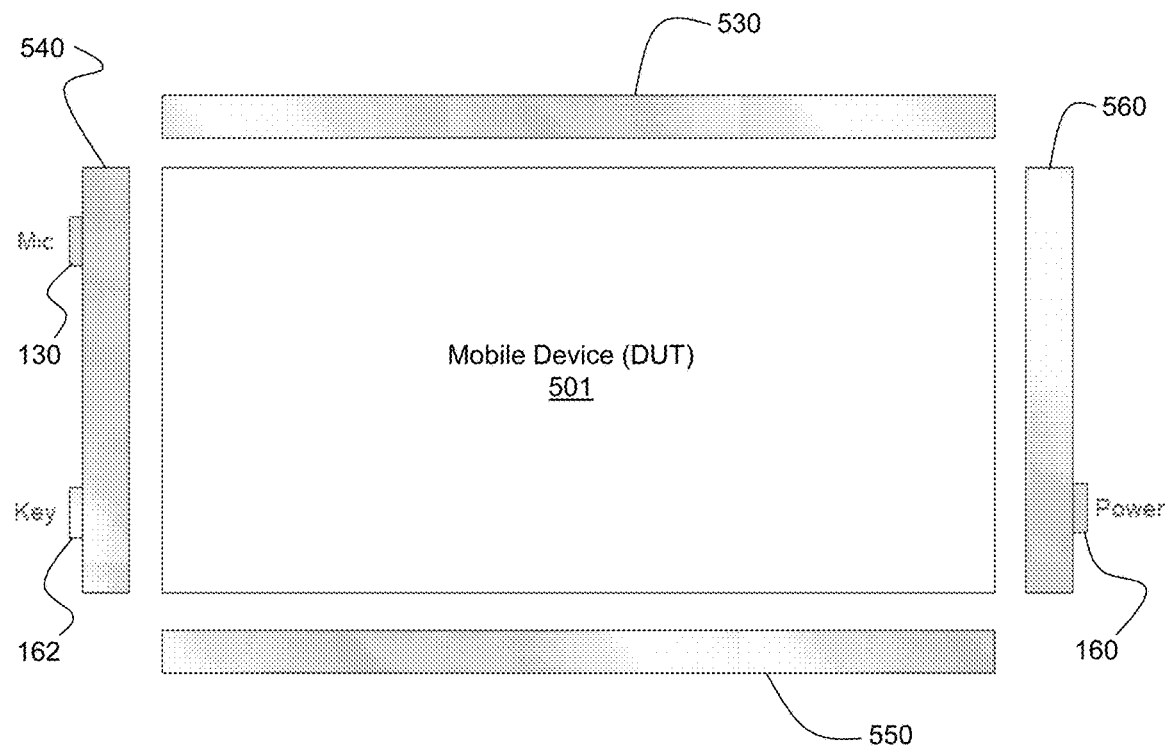
FIG. 7 illustrates a top view of the side components of the test scenario reproduction apparatus of FIG. 5A and FIG. 5B with respect to a mobile device (i.e., a device-under-test).

FIG. 7 illustrates a top view of the side components (530, 540, 550, and 560) of the test scenario reproduction apparatus (TSRA) 500 of FIG. 5A and FIG. 5B with respect to the mobile device 501 (i.e., the device-under-test). Side component 540 includes the audio sensor 130 (e.g., as a microphone) and the button key 162, as shown in FIG. 7. Side component 560 includes the power key 160, as shown in FIG. 7.

In accordance with one embodiment, the installable components (510, 520, 530, 540, 550, and 560) of the TSRA 500 may include circuit boards upon which certain elements of the TSRA (as shown in FIG. 2) are mounted. The installable components (510, 520, 530, 540, 550, and 560) of the TSRA 500 may also include electrical connectors to electrically connect the elements in one installable component to another when installed on the DUT 501. Certain elements and electrical connectors of the TSRA may be at least partially encapsulated in an electrically insulating plastic of the installable components, in accordance with one embodiment. The plastic is configured to physically conform to the physical dimensions of the DUT 501 when installed, in accordance with one embodiment.

Figure 8:
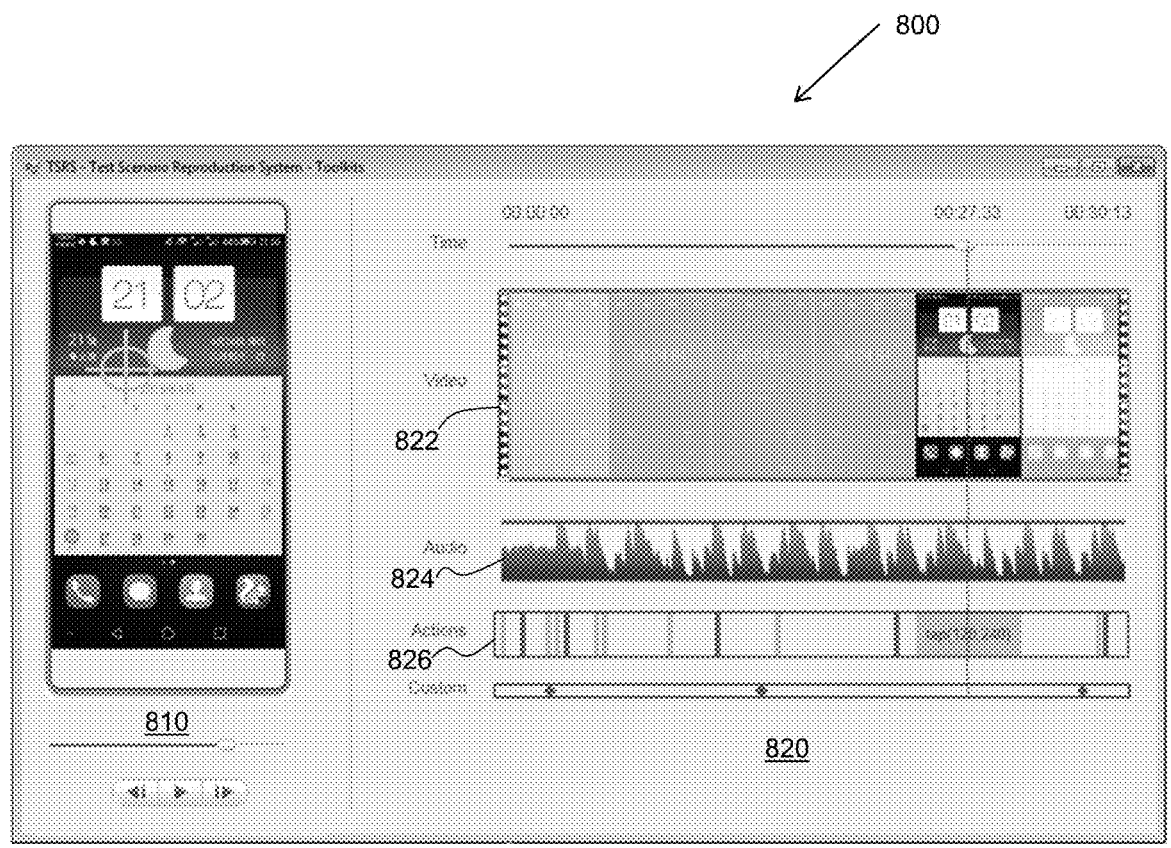
FIG. 8 illustrates an example embodiment of an interactive graphical user interface generated by a test scenario tool kit executing on a computing device and configured to allow a user to view and analyze representations of aspects of a test scenario digitally captured by the test scenario reproduction apparatus of FIG. 2.

FIG. 8 illustrates an example embodiment of an interactive graphical user interface 800 generated by the test scenario tool kit 107 executing on the computing device 105. The interactive graphical user interface 800 is configured to allow a user to view and analyze representations of aspects of a test scenario digitally captured by the test scenario reproduction apparatus (TSRA) 101 of FIG. 1 and FIG. 2. The interactive graphical user interface 800 is generated by the test scenario tool kit 107 of FIG. 1 using digital data read from the removable storage device 103 removed from the TSRA 101 and inserted into a port of the computing device 105. The digital data represents the various aspects of the test scenario performed on a device-under-test (DUT). The digital data is recorded and saved to the removable storage device 103, during the test scenario, by the TSRA 101 installed on the DUT.

In one embodiment, a first panel 810 of the interactive graphical user interface 800 is configured to display a screen image produced by the DUT, as recorded as part of the digital data during the test scenario by the TSRA 101 installed on the DUT. The screen image may correspond to a timestamp resulting from a user pressing the button key 162. In one embodiment, a second panel 820 of the interactive graphical user interface 800 is configured to display tracked portions of the digital data. The tracked portions of the digital data represent image screens (track 822) produced by the DUT, audio (track 824) produced by the DUT and/or the surrounding environment, and coordinates and durations of user interactions or gestures (track 826) with the DUT. The tracked portions are recorded as part of the digital data during the test scenario by the TSRA 101 installed on the DUT.

In this manner, a user (e.g., a software developer associated with the DUT) can playback the recorded test scenario on the computing device 105 and analyze the test scenario such that a problem occurring during the test scenario may be reproduced on the DUT by the user. The user can see exactly what the tester did during the test scenario and how the DUT responded. In one embodiment, the interactive graphical user interface provides various slide tools, scroll bars, replay buttons, and other operational tools that allow the user to thoroughly review the test scenario as recorded by the TSRA 101 and as presented on the computing device 105.

Computing Device Embodiment

Figure 9:
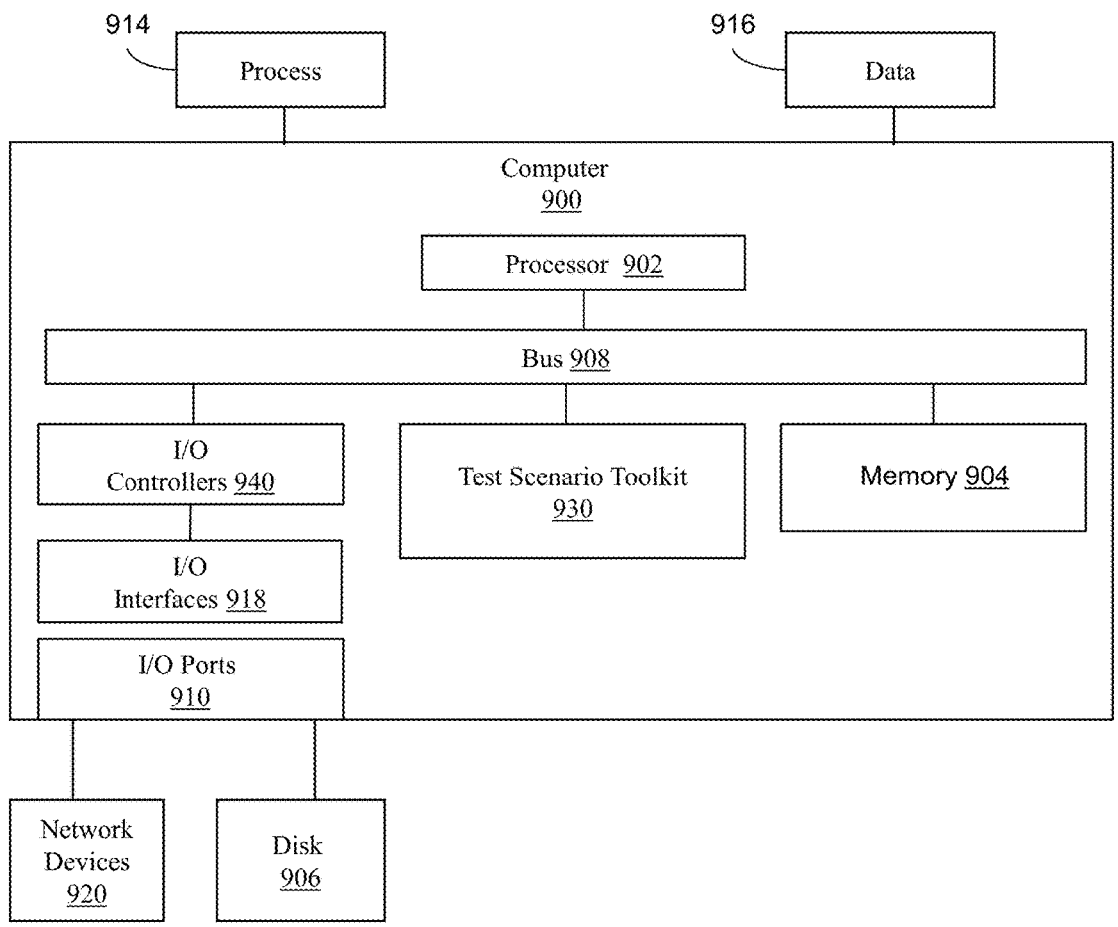
FIG. 9 illustrates one embodiment of a computing device having a test scenario toolkit installed thereon.

FIG. 9 illustrates an example computing device that is configured and/or programmed with one or more of the example systems and methods described herein, and/or equivalents. FIG. 9 illustrates one example embodiment of a computing device upon which an embodiment of a test scenario toolkit may be implemented. The example computing device may be a computer 900 that includes a processor 902 and a memory 904 operably connected by a bus 908.

In one example, the computer 900 may include the test scenario toolkit 930 (corresponding to the test scenario toolkit 107 from FIG. 1) which is configured to generate an interactive graphical user interface that allows a user to view and analyze a test scenario recorded as digital data on a removable storage device. In different examples, the test scenario toolkit 930 may be implemented in hardware, a non-transitory computer-readable medium with stored instructions, firmware, and/or combinations thereof. While the test scenario toolkit 930 is illustrated as a hardware component attached to the bus 908, it is to be appreciated that in other embodiments, the test scenario toolkit 930 could be implemented in the processor 902, a module stored in memory 904, or a module stored in disk 906.

In one embodiment, the test scenario toolkit 930 or the computer 900 is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to facilitate the viewing and analyzing of a test scenario. The means may also be implemented as stored computer executable instructions that are presented to computer 900 as data 916 that are temporarily stored in memory 904 and then executed by processor 902.

Generally describing an example configuration of the computer 900, the processor 902 may be a variety of various processors including dual microprocessor and other multi-processor architectures. A memory 904 may include volatile memory and/or non-volatile memory. Non-volatile memory may include, for example, ROM, PROM, and so on. Volatile memory may include, for example, RAM, SRAM, DRAM, and so on.

A storage disk 906 may be operably connected to the computer 900 via, for example, an input/output interface (e.g., card, device) 918 and an input/output port 910. The disk 906 may be, for example, a magnetic disk drive, a solid state disk drive, a floppy disk drive, a tape drive, a Zip drive, a flash memory card, a memory stick, and so on. Furthermore, the disk 906 may be a CD-ROM drive, a CD-R drive, a CD-RW drive, a DVD ROM, and so on. The memory 904 can store a process 914 and/or a data 916, for example. The disk 906 and/or the memory 904 can store an operating system that controls and allocates resources of the computer 900.

The computer 900 may interact with input/output devices via the i/o interfaces 918 and the input/output ports 910. Input/output devices may be, for example, a keyboard, a microphone, a pointing and selection device, cameras, video cards, displays, the disk 906, the network devices 920, and so on. The input/output ports 910 may include, for example, serial ports, parallel ports, and USB ports.

The computer 900 can operate in a network environment and thus may be connected to the network devices 920 via the i/o interfaces 918, and/or the i/o ports 910. Through the network devices 920, the computer 900 may interact with a network. Through the network, the computer 900 may be logically connected to remote computers. Networks with which the computer 900 may interact include, but are not limited to, a LAN, a WAN, and other networks.

Systems, methods, and other embodiments associated with capturing and analyzing a test scenario performed on a device-under-test by a user have been described. In one embodiment a test scenario reproduction apparatus (TSRA), made up of multiple installable components, is configured to be installed around a device-under-test (DUT). The multiple installable components include embedded elements for sensing and recording data during the test scenario, and for allowing user interaction with the DUT through the TSRA. In accordance with one embodiment, the embedded elements include a permeability layer, a camera sensor, a pressure sensor, an audio sensor, an image recorder, a gesture recorder, and an audio recorder. The multiple installable components are configured to physically conform to the DUT when installed to allow the functionality of the DUT to be exercised by the user through the installable components.

Definitions and Other Embodiments

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
HTTP: hypertext transfer protocol.
LAN: local area network.
RAM: random access memory.
DRAM: dynamic RAM.
SRAM: synchronous RAM.
ROM: read only memory.
PROM: programmable ROM.
EPROM: erasable PROM.
EEPROM: electrically erasable PROM.
USB: universal serial bus.
WAN: wide area network.

"Computer-readable medium" or "computer storage medium", as used herein, refers to a non-transitory medium that stores instructions and/or data configured to perform one or more of the disclosed functions when executed. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable (or operative) connection", or a connection by which entities are "operably (or operatively) connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). An operable connection may include one entity generating data and storing the data in a memory, and another entity retrieving that data from the memory via, for example, instruction control. Logical and/or physical communication channels can be used to create an operable connection. The terms "operable" and "operative", and there various forms, may be used interchangeably herein.

"User", as used herein, includes but is not limited to one or more persons, computers or other devices, or combinations of these.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional actions that are not illustrated in blocks. The methods described herein are limited to statutory subject matter under 35 U.S.C § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

To the extent that the phrase "one or more of, A, B, and C" is used herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be used.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims.

What is claimed is:

1. A test scenario reproduction apparatus comprising:
  at least one installable component, configured to be installed on a device-under-test, wherein the at least one installable component includes:
    a permeability layer embedded in the installable component, the permeability layer configured to:
      allow a screen image produced by the device-under-test to penetrate the permeability layer from below the permeability layer to above the permeability layer, and
      transfer gestures, impinged upon the permeability layer from above by a user's touch on the installable component, to the device-under-test;
    a camera sensor configured to sense the screen image produced by the device-under-test from below the permeability layer, wherein the camera sensor is embedded in the installable component;
    a pressure sensor configured to sense coordinates and durations of the gestures, wherein the pressure sensor is embedded in the installable component and senses the gestures impinged upon the permeability layer from above by the user's touch on the installable component;
    an image recorder configured to record the screen image as sensed by the camera sensor; and
    a gesture recorder configured to record the coordinates and the durations of the gestures as sensed by the pressure sensor,
  wherein the at least one installable component is configured to physically conform to at least a portion of the device-under-test to allow functionality of the device under-test to be accessible by the user through the at least one installable component.

2. The test scenario reproduction apparatus of claim 1, wherein the at least one installable component includes an energy storage device configured to provide electrical power to at least the camera sensor, the pressure sensor, the image recorder, and the gesture recorder, wherein the energy storage device is embedded in the installable component.

3. The test scenario reproduction apparatus of claim 1, wherein the at least one installable component includes:
  an audio sensor configured to sense sounds produced by at least the device-under-test wherein the audio sensor is embedded in the installable component; and
  an audio recorder configured to record the sounds as sensed by the audio sensor.

4. The test scenario reproduction apparatus of claim 1, wherein the device-under-test comprises a mobile telephone having a touch-sensitive display screen.

5. The test scenario reproduction apparatus of claim 1, wherein the at least one installable component includes:
  a removable storage device embedded in the at least one installable component; and a multiplexing device configured to store at least the screen image and the coordinates and the durations of the gestures as digital data in a file library on the removable storage device.

6. The test scenario reproduction apparatus of claim 5, wherein the removable storage device is configured to be removed from the at least one installable component and inserted into a port of an external computing device for the digital data in the file library to be read and processed by a software tool package on the external computing device.

7. The test scenario reproduction apparatus of claim 1, wherein the at least one installable component includes a top component configured to be installed on a top portion of the device-under-test, a bottom component configured to be installed on a bottom portion of the device-under-test, and at least one side component configured to be installed on a side portion of the device-under-test, wherein the top component, bottom component, and at least one side component snap together to form a mechanical and electrical connection.

8. The test scenario reproduction apparatus of claim 7, wherein the top component, the bottom component, and the at least one side component are configured to form a protective housing around the device-under-test when installed.

9. The test scenario reproduction apparatus of claim 7, wherein the at least one side component includes at least one of:
   a power key configured to be manipulated by the user to start and stop recording of at least the screen image and the coordinates and the durations of the gestures; and
   a button key configured to be manipulated by the user to record a timestamp corresponding to a current time.

10. The test scenario reproduction apparatus of claim 9, wherein the at least one side component includes a key recorder configured to record data indicating manipulations of at least one of the power key and the button key.

* * * * *